United States Patent [19]

Devins

[11] Patent Number: 4,768,646

[45] Date of Patent: Sep. 6, 1988

[54] ACCUMULATOR CONVEYOR

[76] Inventor: Theodore R. Devins, 16 Beverly Dr., Hamilton, Ohio 45013

[21] Appl. No.: 2,104

[22] Filed: Jan. 12, 1987

[51] Int. Cl.⁴ .............................................. B65G 25/08
[52] U.S. Cl. .................................... 198/718; 198/741; 198/746; 198/772
[58] Field of Search ............... 198/718, 721, 736, 717, 198/738, 741–746, 747, 749, 751, 772, 774, 777, 748

[56] References Cited

U.S. PATENT DOCUMENTS

| | | | |
|---|---|---|---|
| 3,289,821 | 12/1966 | Bosse et al. | 198/774 |
| 4,202,440 | 5/1980 | Niki | 198/718 |
| 4,248,563 | 2/1981 | Fur | 198/718 X |
| 4,411,355 | 10/1983 | Furlette et al. | 198/718 |
| 4,484,676 | 11/1984 | Plumridge et al. | 198/718 |

Primary Examiner—Robert J. Spar
Assistant Examiner—Lyle Kimms
Attorney, Agent, or Firm—Wood, Herron & Evans

[57] ABSTRACT

An accumulator conveyor having a load support frame defined by side rails each having a series of idler wheels, the load support frame defining a load support plane adapted to support a series of loads along its length. A shuttle frame is reciprocable relative to, and preferably supported by, the load support frame. The shuttle frame carries a series of pusher bars spaced one from the other to define a series of load stations along the conveyor's length. A novel drive mechanism reciprocates the shuttle frame, and therefor the pusher bar assemblies, relative to the stationary load support frame, for indexing any load on the load support frame from an upstream station to an adjacent downstream station. The conveyor also includes a novel station lock out system which causes the pusher bar of a station to be latched down beneath the support plane of the load in that station when loads are parked in all stations downstream therefrom. And further, the station lock out system includes novel structure which permits any one or more pusher bars to be latched down substantially beneath the load support plane if the load parked in any one station has a bottom surface that is deformed beneath that load support plane.

50 Claims, 7 Drawing Sheets

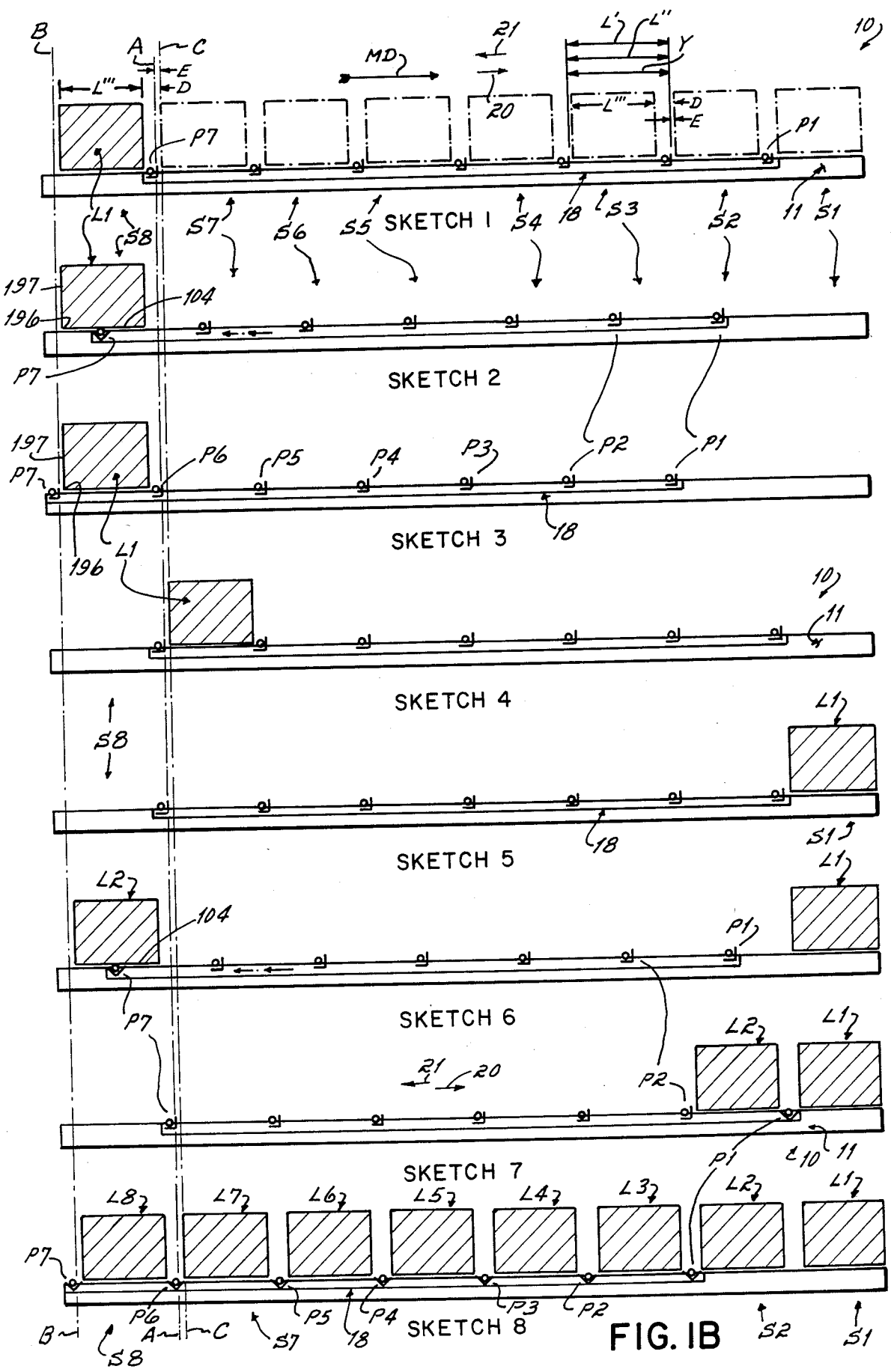

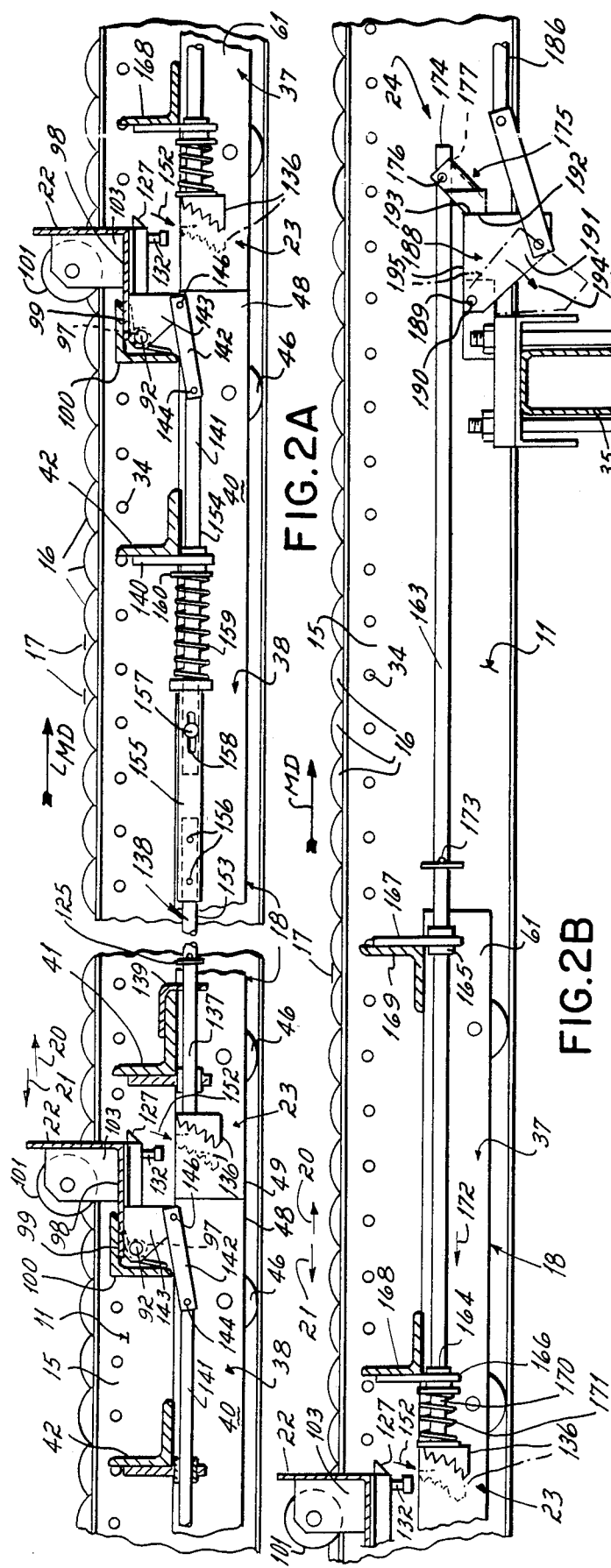
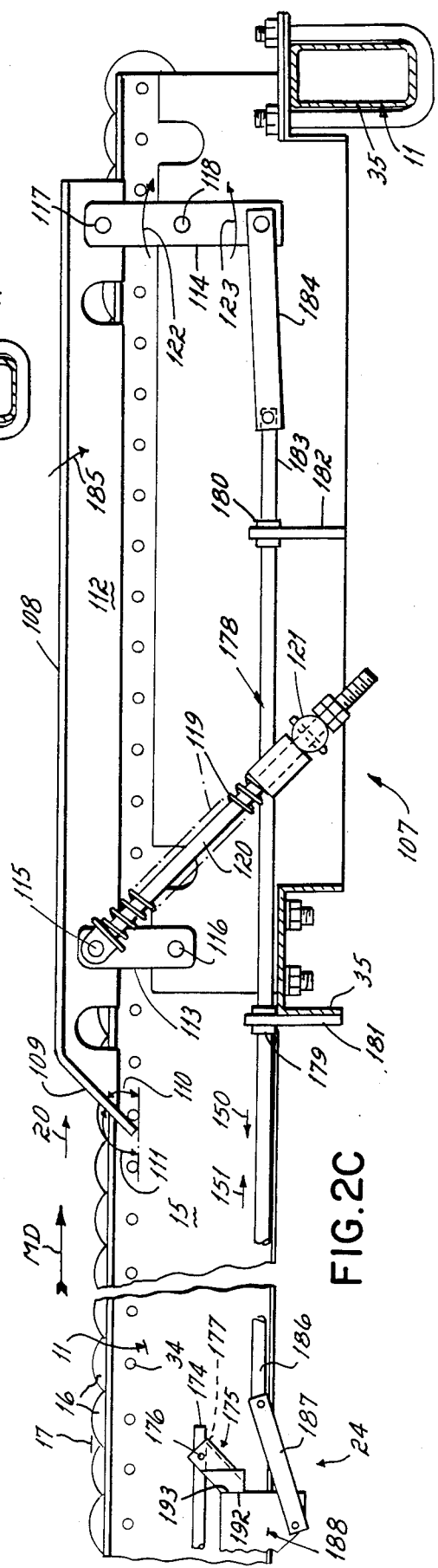
FIG.2A
FIG.2B
FIG.2C

ACCUMULATOR CONVEYOR

This invention relates to conveyor systems. More particularly, this invention relates to accumulator conveyor systems.

Accumulator conveyor systems are very well known to the prior art. The basic operational concept behind an accumulator conveyor system is to advance a series of loads along a conveyor from an on load station to an off load station. The accumulator conveyor is subdivided into a series of intermediate stations between the on load and off load stations, each of the stations being substantially equal in conveyor length. A pusher assembly is associated with each station except the off load station so as to move the load in any one station to an adjacent downstream station. In this way, and when a first load is accepted at the on load station, that first load is conveyed along the conveyor length from station to station until it reaches the off load station. And successive loads are thus conveyed down the conveyor length. These loads are accumulated along the conveyor upstream from the off load station as long as no load is taken away from the off load station. In other words, in order to achieve the accumulation of loads along the conveyor in successive stations upstream of the off load station, the pusher assemblies associated with each of the stations are locked out in succession as the loads reach the respective and adjacent downstream stations. Thus, and in operational sequence, a series of loads can be accumulated on the accumulator conveyor, and will remain so accumulated on the accumulator conveyor until the first load is removed from the off load station. When the first load is so removed, then all the loads in the upstream stations are indexed one station down to the off load station.

The accumulator conveyor concept is a very important materials handling concept in various businesses. But the accumulator conveyors known to the prior art, and which are commercially available, all have a couple of drawbacks from the end user's standpoint. First, the drive mechanisms used to index the pusher bars in prior art accumulator coveyors are generally quite complex and, therefor, relatively costly to manufacture and relatively costly to maintain. So it has been one objective of this invention to provide an improved accumulator conveyor system which incorporates a novel drive mechanism to achieve indexing of loads on that conveyor one station at a time from the on load station on down the length of the conveyor to the off load station. A second problem associated with prior art accumulator conveyors is the complexity of the pusher bar lock out mechanism that is used to nullify the pusher bar function when a load is in a given station if all down stream stations also have loads accumulated therein. Again, such prior art lock out mechanisms are relatively costly to manufacture, and relatively difficult to maintain in operational condition. So another objective of this invention has been to provide an improved station lock out system that incorporates a mechanical linkage which is operationally activated and controlled on a station by station basis depending on whether a load is parked in the conveyor's off load station and succeeding upstream stations therefrom. Another problem associated with prior art accumulator conveyors is that often times the load has an outwardly deformed undersurface on which it is supported by the conveyor, and the pusher may interact with this deformation when a load is temporarily accumulated or parked within a station. So it has been a further objective of this invention to provide an improved accumulator conveyor that incorporates a station lock out system which permits the pusher bar to be locked out sufficiently beneath the undersurface of a load so that a pusher bar will not interact with a deformed bottom surface of a load to an undesirable extent when the bottom surface deformed load is accumulated or parked in any one station and the pusher bar is latched down beneath that load.

In accord with the above noted objectives, the accumulator conveyor of this invention, in preferred form, incorporates a load support frame basically comprised of spaced side rails each of which is provided with idler wheels to establish a load support plane. A shuttle frame is interposed between, and reciprocably supported by, the load support frame's side rails. The shuttle frame mounts a series of pusher bars that sub-divide the shuttle frame and, therefor, the accumulator conveyor, into a series of load stations. An off load station defined by the load support frame is positioned at the downstream end of the shuttle frame. The off load station includes a mechanically operable sensor that is actuated when a load is received in the off load station. This sensor cooperates with a unique mechanical linkage station lock out system which latches down each of the pusher bars in succeeding upstream stations when a load is accumulated or parked in an adjacent downstream station. The shuttle frame reciprocates continuously in a stroke length substantially equal to the length of a load station, each pusher bar extending above the conveyor's load support plane in the downstream pushing stroke, and retracting beneath a load carried on the load support frame if a load is parked in that station on the upstream return stroke. And the latched down position of the pusher bar beneath the support plane is variable depending on whether the load parked at any one station is deformed on its bottom surface or not, the lock out position being dependent on the extent of that deformation.

Other objectives and advantages of this invention will be more apparent from the following detailed description taken in conjunction with the drawings in which:

FIG. 1B is a schematic view illustrating the operational sequence of an accumulator conveyor in accord with the principles of this invention;

FIG. 2A-2C are detailed side views of certain load stations of the accumulator conveyor;

FIG. 8 is an enlarged side view of a pusher bar assembly showing the assembly in the locked out position.

Figure 1A:
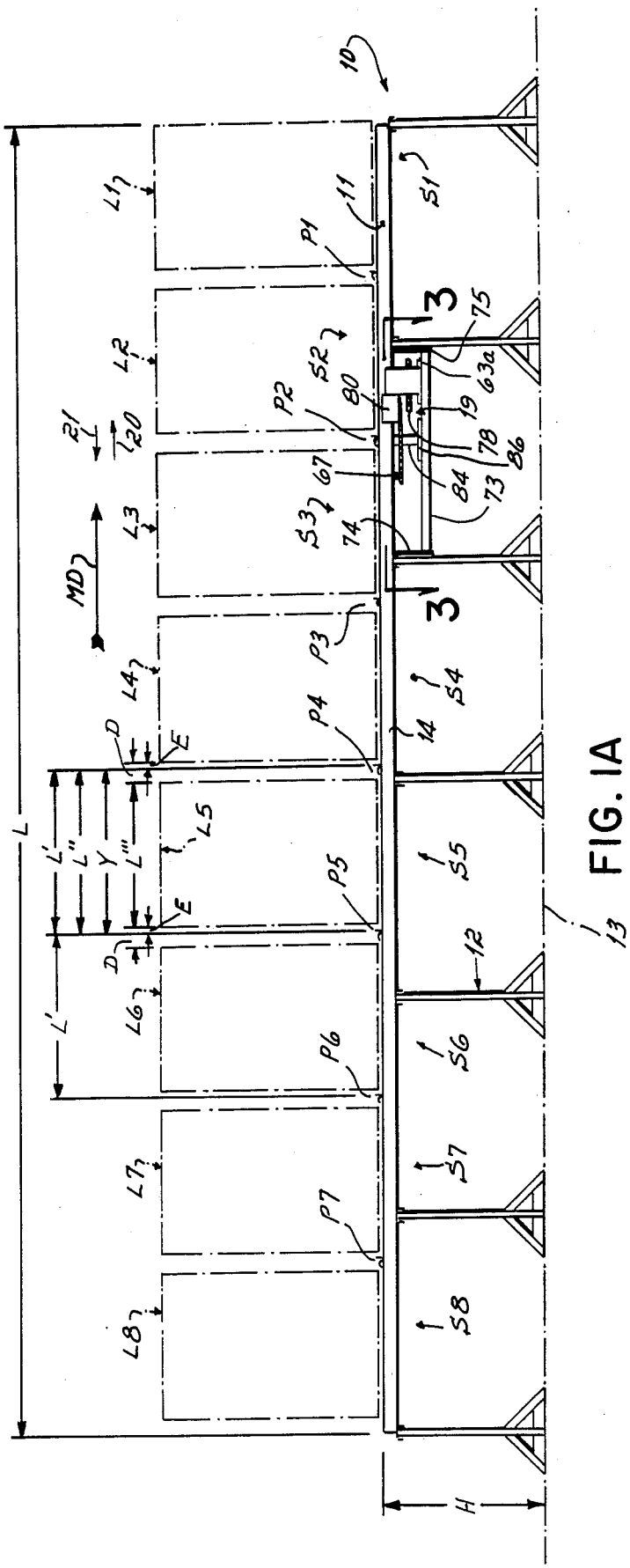
FIG. 1A is a schematic side view illustrating an accumulator conveyor in accord with the principles of this invention.

An accumulator conveyor 10 in accord with the principles of this invention is generally illustrated in FIG. 1A and 1B. The conveyor 10 illustrated is of a length L sufficient to establish eight load stations S1-S8 to permit accumulating or parking a series of eight loads L1–L8, all of the load stations S1–S7 upstream of the off load station, S-1 being of equal length L' one relative to the other, and being separated one from the other by a distance D. Stated another way, each load station length L' is equal to the length L''' of each load L1–L8 plus a distance D between the loads. Pusher bars P1–P7 occupy this space D between the stations while they are in their rest or park position. The conveyor 10 includes an off load station S1, a queing station S2, five inline load stations S3–S7, and an in load station S8.

The conveyor 10 itself basically includes a load support frame 11 that is elevated by stands 12 above ground 13. The load support frame 11 is immobile or fixed relative to ground 13. The load support frame 11 is comprised of opposed side rails 14, 15 each of which mounts a series of idler or skate wheels 16, thereby establishing the conveyor's load support plane 17, see FIGS. 3 and 4. The conveyor 10 also includes a unitary shuttle frame 18 connected to and supported by the load support frame's side rails 14, 15, that shuttle frame being reciprocable relative to the machine direction MD of the conveyor. The shuttle frame 18 is reciprocated or oscillated through repeated push and return cycles by a unique crank drive mechanism 19. The push stroke 20 and return stroke 21 of this reciprocating cycle are of a length L'' which is equal to station length L' plus an arbitrary distance E located within the space D. This stroke length L'' is also equal load length L''' plus distance D. The shuttle frame 18 mounts a series of pusher bars P1–P7 (and referred individually hereinafter by reference number 22) at spaced locations along its length. The distance Y between pusher bars being substantially equal to the stroke length L'' of the shuttle frame and, thereby, substantially equal to the length L' of each load station S2–S8. Each pusher bar 22 is connected to the shuttle frame 18 in such fashion that it is movable between a pushing position shown in FIGS. 2A and 2B, and a retracted or storage position shown in FIG. 8. The pusher bar 22 is held in the retracted position by means of a unique station lock out system which includes individual station lock out devices 23 associated with each of the on-load and in-line stations S2–S8, and a lock out actuator latch 24 associated with the off load station S-1.

Figure 3:
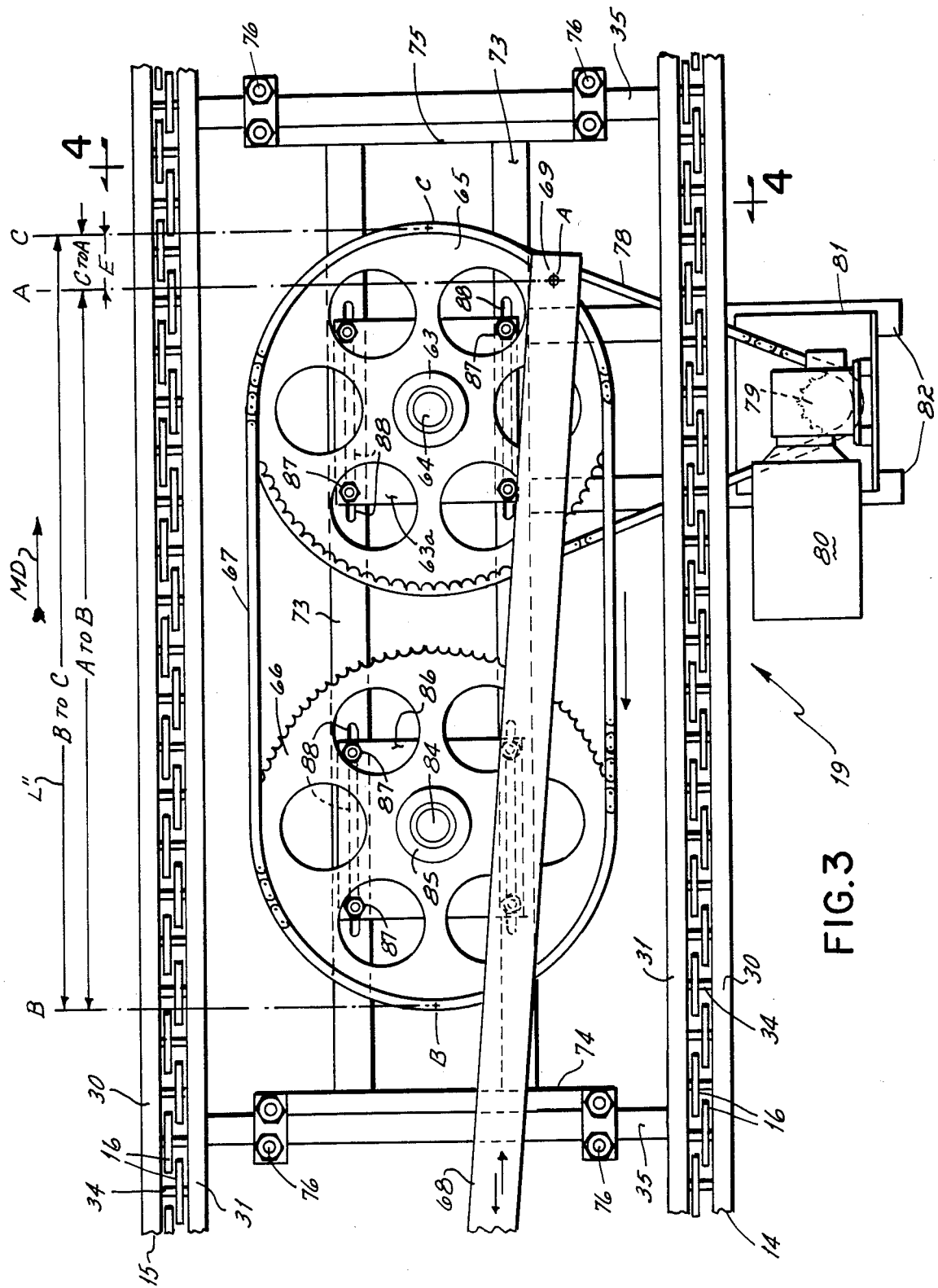
FIG. 3 is a cross sectional view taken along line 3—3 of FIG. 1A.
Figure 4:
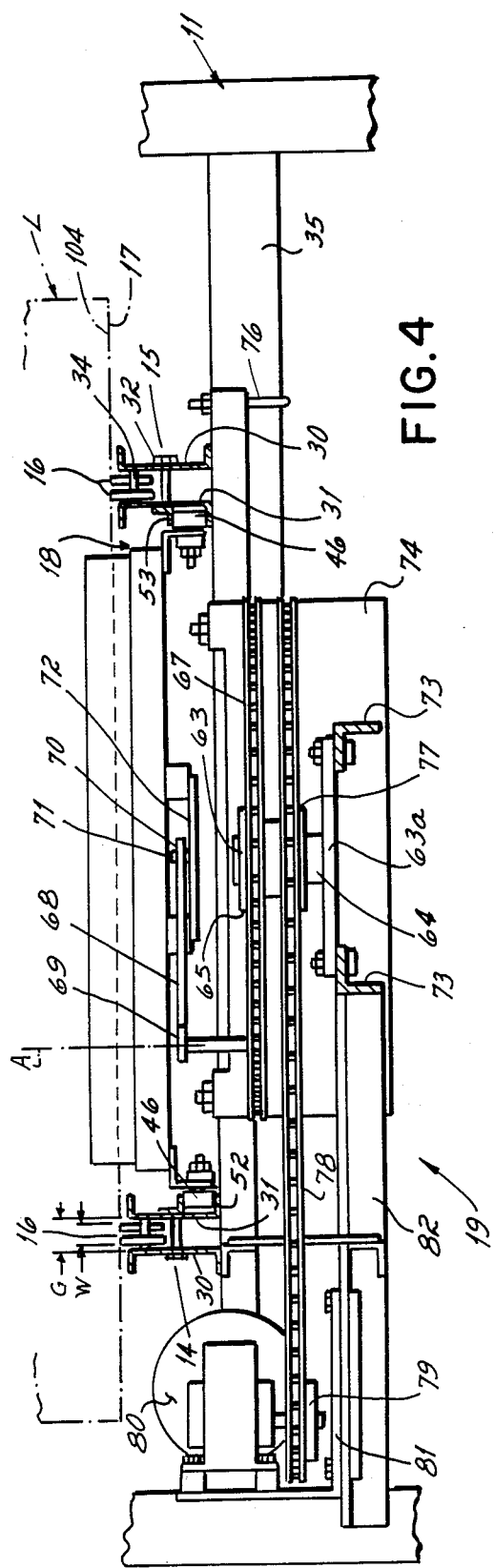
FIG. 4 is a cross sectional view taken along line 4—4 of FIG. 3.

More specifically, and as illustrated in FIGS. 1A, 3 and 4, the load support frame 11 includes opposed side rails 14, 15 parallel one to the other that extend the entire length L of the accumulator conveyor 10. Each of these side rails 14, 15 is comprised of an outside rail 30 and an inside rail 31 held together in fixed relation by a plurality of bolts 32. A series of skate wheels 16, each wheel on an axle 34, are fixed between the insdie and outside rails 30, 31 along the length of each rail 14, 15. The skate wheels 16 are alternated in position relative to the gap G between the outside 30 and inside 31 rails so as to provide a support surface width W. And the skate wheels 16 on the rails 14, 15 cooperate together, as shown in FIG. 4, to provide the support plane 17 for all loads L1–L8 carried by the accumulator conveyor 10. The load support frame's side rails 14, 15 are held in spaced relation one to the other by cross braces 35 fixed thereto at spaced locations along the conveyor's length L. The load support frame 11 and, therefore, the accumulator conveyor 10, is held at a height H above ground 13 by stands 12 fixed to those cross braces 35.

The accumulator conveyor 10 also includes the shuttle frame 18, as previously noted, see FIGS. 2A, 2B, 4 and 5. The shuttle frame 18 is comprised of an upstream end section 36, a downstream end section 37, and a series of modular intermediate sections 38, see FIG. 5. Each of the modular intermediate shuttle frame sections 38 is comprised of opposed side rails 39, 40 held together in fixed relation by transverse cross braces 41, 42 at the upstream and downstream ends thereof, and by an angled cross brace 43. Each modular shuttle frame section 38 also includes a pusher bar 22 assembly, described in further detail below, and a portion of the station lock out system, also described in further detail below. The downstream end of each modular intermediate section 38 is provided with male connectors 44 that cooperate with female connectors 45 at the upstream end of the adjacent shuttle frame section so that the shuttle frame sections 36–38 can be bolted together one with another to provide one unitary shuttle frame 18. Note particularly each modular intermediate section 38 includes idler or skate wheels 46 mounted on a horizontal axis 47 at the section's leading 48 and trailing 49 ends, and a centering idler wheel 50 mounted on a vertical axis 51 intermediate the ends 48, 49. As particularly illustrated in FIG. 4, the shuttle frame's skate wheels 46 are received in inwardly directed channels 52, 53 defined by and extending the length of the load support frame's inside rails 31, thereby connecting the shuttle frame 18 with the load support frame 11 in a manner that permits it to roll or move relative to ground 13 vis-a-vis the load support frame. Note also that the shuttle frame's centering wheels 50 cooperate with the inside surface of the load support frame's inside rails 31 so that the shuttle frame 18 is kept in a centered position relative to the load support frame's side rails 14, 15 thereby insuring that the shuttle frame 18 does not bind or lock up with the load support frame so as to provide relatively free reciprocal or oscillatory motion of the shuttle frame relative to the main support frame as explained in further detail below.

The shuttle frame 18 also includes an upstream end section 36 and a downstream end section 37, same being significantly different from the modular intermediate sections 38. The upstream end section 36 is simply a pusher bar 22 assembly, which is explained in further detail below, mounted on very short side rails 57, 58 having connectors 59 that interconnect with the adjacent modular intermediate section's side rail connectors 45 at the upstream end thereof. And the downstream end section 37 is simply comprised of side rails 60, 61 with a portion of the station lock out system carried thereto, the side rails 60, 61 having connectors 62 that interconnect with connectors 44 on the adjacent modular intermediate section 38. So the shuttle frame 18 length can be lengthened or shortened, i.e., the number of loads L1–L8 which the accumulator conveyor 10 is adapted to serve can be increased or decreased, simply by adding to or subtracting from the shuttle frame 18 one or more modular intermediate sections 38, and simply by providing a corresponding increase or decrease in the length L of the load support frame 11.

The shuttle frame drive mechanism 19 is particularly illustrated in FIGS. 1A, 3 and 4. This drive mechanism 19 includes a driven sprocket 65 and an idler sprocket 66 interconnected one with the other by drive chain 67. A crank 68 is pivotally fixed at one end 69 to the drive chain as shown in FIG. 3, and at the other end 70 is pivotally connected as at 71 to bracket 72 fixed to the underside of the shuttle frame 18. Accordingly, the shuttle frame 18 is reciprocable on its skate wheels 46, relative to the load support frame 11, a stroke length L" which is equal to the distance between points B and C on the drive chain travel path at the sprockets 65, 66 rotate and the drive chain 67 moves around those sprockets. This stroke length L" of the drive crank 68 is equal to the strokes 20, 21 of the pusher bars 22 shown in FIG. 1A. The stroke length C to A of FIG. 3 is equal to the distance E (rest position of the pushers in space D).

More specifically, and as shown in FIG. 4, the driven sprocket 65 is mounted on axle 64 carried in bearing 63 fixed to bearing plate 63a, the bearing plate being mounted on spaced parallel drive support braces 73, 73. The drive support braces 73, 73 are in turn fixed at their opposed ends to end plates 74, 75 hung from the load support frame's cross braces 35 and connected thereto by U-bolts 76. The axle 64 also includes power transfer sprocket 77 connected by chain 78 to power sprocket 79 powered by motor 80. The motor 80 and power sprocket 79 are carried on motor plate 81 fixed to spaced motor braces 82, 82 mounted to a drive support brace 73. Thus, the power transfer chain 78 interconnects the power transfer sprocket 77 and the power sprocket 79. The idler sprocket 66 is mounted on axle 84 carried in bearing 85 fixed to bearing plate 86. The idler sprocket's bearing plate 86, as well as the driven sprocket's bearing plate 63a, are carried on the drive support braces 73, 73. Both these bearing plates 63a, 86 are slideably mounted on those braces 73 by virtue of bolts 87 and slots 88 in the braces. This permits the idler sprocket 66 and the driven sprocket 65 to be adjusted toward or away from one another, i.e., permits the length of the shuttle drive chain 67 to be lengthened or shortened. And this, in turn, permits the stroke length L" of the drive crank to be shortened or lengthened as required in order to mate the stroke length L" of the drive crank with the length L' of the load stations S2–S7 as defined by the distance Y between adjacent pusher bars 22. Note particularly the power transfer 77, driven 65 and idler 66 sprockets are all located in a horizontal plane relative to ground, and the diameter of each is such that they all can be located underneath the shuttle frame 18 between the side rails 14, 15 of the load support frame 11, thereby providing a very compact and simple drive mechanism 19 for all pusher bars 22. This crank drive mechanism 19 delivers a smooth and harmonious acceleration and de-acceleration at the beginning and end of each crank stroke 20, 21 to the shuttle frame 18. And this, in turn, minimizes any toppling effect that the reciprocable strokes 20, 21 of the shuttle frame 18 might have on the loads L1–L8 carried on the load support frame 11.

Figure 5:
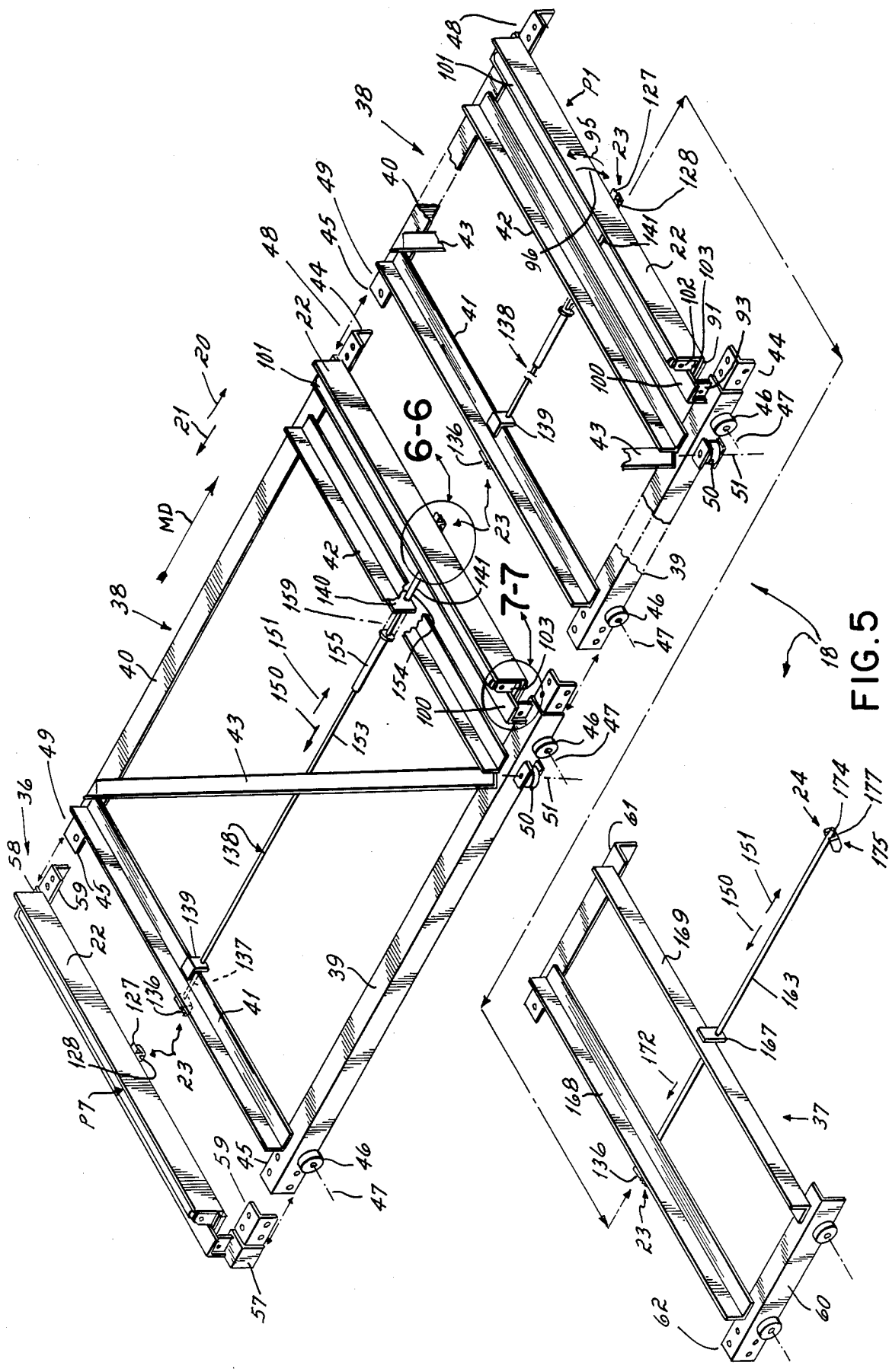
FIG. 5 is an exploded perspective view of a portion of the conveyor's shuttle frame.
Figure 6:
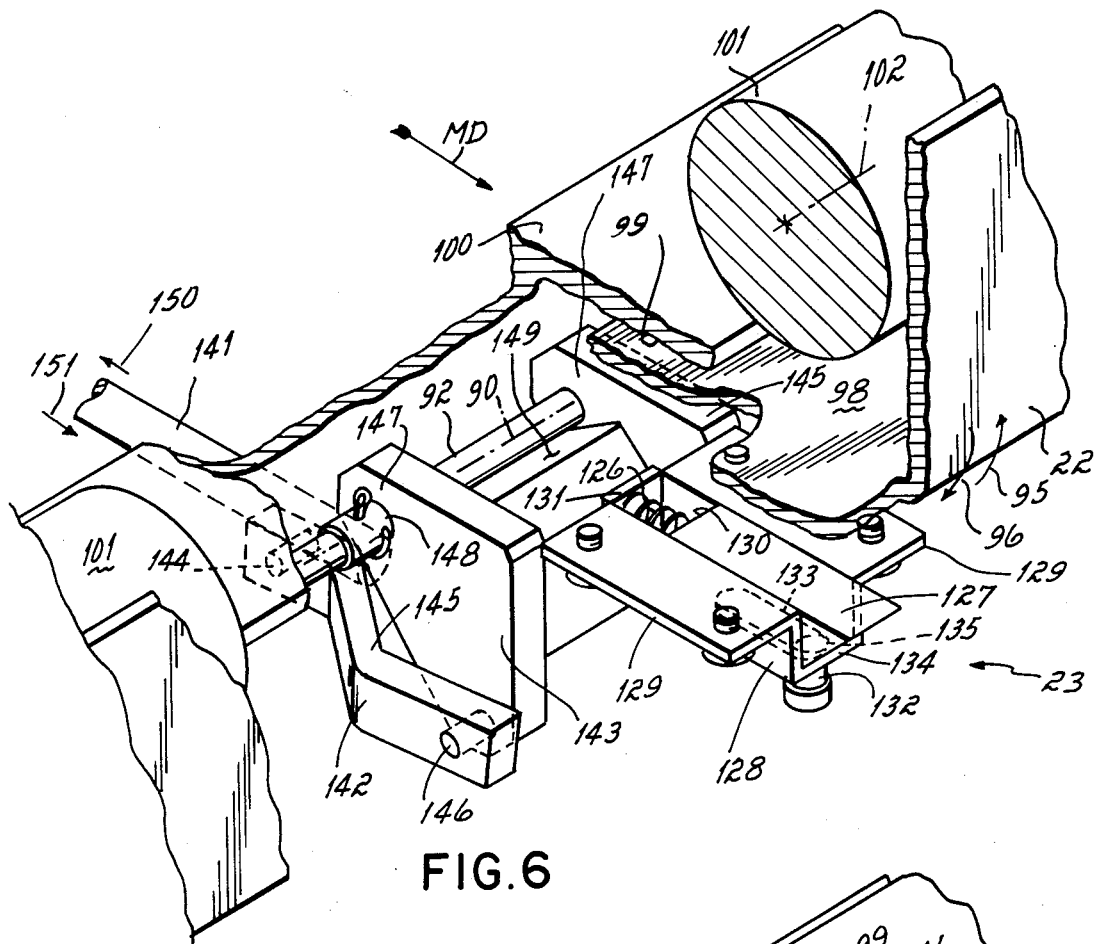
FIG. 6 is an enlarged view of encircled section 6—6 of FIG. 5.
Figure 7:
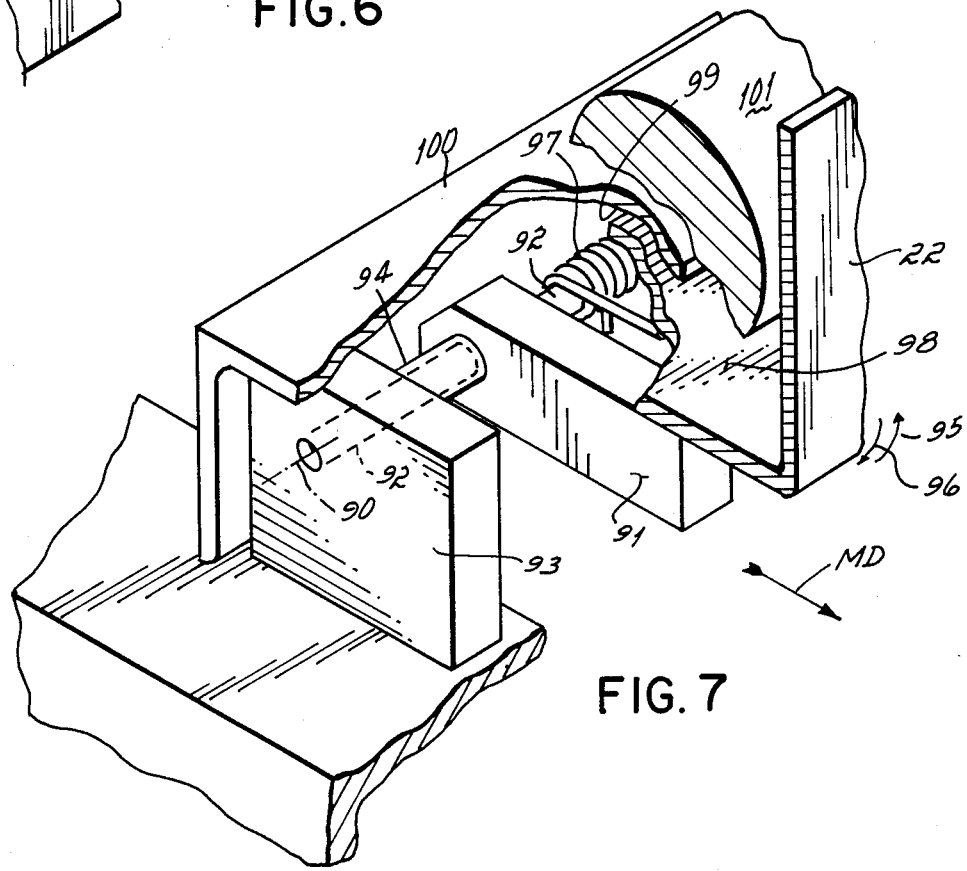
FIG. 7 is an enlarged view of encircled section 7—7 of FIG. 5.

The shuttle frame 18 carries a series (P1 thru P7) of pusher bar assemblies 22, the number of pusher bar assemblies being one short of the number of load stations S1–S8. In other words, the conveyor includes eight load stations S1–S8, but the off load station makes use of no pusher bar 22 assembly. The detailed structure of each pusher bar 22 assembly is illustrated in FIGS. 5–7. Each pusher bar 22 assembly includes an angle shaped pusher bar 22 pivotally mounted to the shuttle frame's side rails 39, 40 on pivot axis 90. Each end of the pusher bar 22 is fixed to a pivot arm 91 mounted on pivot pin 92 that extends the full width of the shuttle frame 18. The pivot pin 92 is pivotally received, at its opposite ends, in bearing blocks 93 fixed to the shuttle frame's side rails 39, 40. Spacer sleeve 94 maintain appropriate spacing between the pusher bar's pivot arm 91 and bearing blocks 93 so as to ensure free pivot motion of the pusher bar 22 in the direction shown by phantom arrows 95, 96 relative to the shuttle frame. A pusher bar coil spring 97 is provided on the pivot pin 92 to spring load the pusher bar in the counterclockwise direction 95 shown in the figures. This pusher bar return spring 97 permits the pusher bar 22 to be depressed or deflected in the clockwise direction 96 as illustrated in the figures against the spring force exerted by that spring, but as mentioned continuously biases the pusher bar in the counterclockwise direction 95 into an extended or pushing position. The pusher bar 22 is located or stopped in its pushing position by abutment of the pusher bar's face 98 with the underface 99 of a pusher bar stop 100 defined by an angle brace extending the entire width of the shuttle frame 18 and fixed at its opposite to opposed side rails 39, 40 of that shuttle frame. The pusher bar 22 also includes a return or cam roller 101 that extends the length of the pusher bar (and, therefor, that extends transversely of the machine direction MD of the shuttle frame 18). The roller 101 is mounted for free rotation on axis 102 by bearing blocks 103 fixed to opposite ends of the pusher bar, see FIGS. 2A and 5. Note, as shown in FIG. 2A, that in the rest or extended position the pusher bar 22 extends substantially above the support plane 17 for the conveyor's loads L1–L8, and the roller 101 is positioned rearwardly (relative to the machine direction MD) of the pusher bar. The roller 101 interacts with the undersurface 104 of loads L1–L8 carried by the load support frame 11 on the shuttle frame's return stroke 21 as discussed in greater detail below. So the pusher bar 22 is normally biased by pusher return spring 97 into the pushing attitude shown in FIG. 2A during a pushing stroke 20 of the shuttle frame 18, and is deflected or retracted underneath that support plane 17 as shown in FIG. 8 during the return stroke 21 of the shuttle frame if a load is present in a load station S2–S8 served by that pusher bar. In other words, and if a load L2–L8 is present in a given conveyor station S2–S8 during the return stroke 21 of the shuttle frame 18, the pusher bar 22 is cammed down by roller 101 so that the pusher bar ducks down under the support plane 17 and roller 101 rolls against the bottom surface 104 of the load in that load station during the return stroke 21 of the shuttle frame (and, hence, the pusher bar) in the reciprocable stroke 20, 21 cycle of the shuttle frame 18.

The off load station S1, as previously mentioned, incorporates no pusher bar 22 assembly in its structure. The off load station S1, on the other hand, does incorporate a load sensor system 107 which senses the presence or absence of a load L1–L8 in the off load station, see FIGS. 1B and 2C. The sensor system 107 includes a sensor plate 108 normally upraised above the support plane 17 defined by the load support frame's side rails 14, 15. This sensor plate 108 includes a leading edge lip 109 angled at an acute angle 110 relative to the machine direction MD, the lip extending from the sensor plate in the upstream direction so as to form an obtuse angle 111 with the support plane 17 when the sensor plate is in the rest position with no load in the off load station as shown in FIG. 2C. The sensor plate includes a depending flange 112 at each side edge by which the plate is pivotally connected through upstream pivot link 113 and downstream pivot link 114 to the respective side rails 14, 15 of the load support frame 11. Each upstream pivot link 113 is pivotally connected at 115 to the sensor plate 108 and pivotally connected at 116 to the respective side rail 14, 15. Each downstream pivot link 114 is pivotally connected at 117 to the sensor plate 108 and pivotally connected at 118 to the respective side rail 14, 15. Each upstream pivot link 113 is provided with a spring motor 119 carried on rod 120 pivotally connected at point 115 to the upstream pivot link and pivotally connected at 121 to the respective said rail 14, 15. The spring motors 119 continuously bias the upstream pivot links 113, and hence, the sensor plate 108 to the rest or no-lead position shown in FIG. 2C. When a load L1-L8 moves downstream in machine direction MD and engages the sensor plate's lip 109, the sensor plate is depressed into the load plane 17 as the load is pushed onto to the sensor plate, thereby pivoting the upstream 113 and downstream 114 links in the direction shown by phantom arrow 122. When the load L1-L8 is removed from the off load station S1, e.g., by fork lift truck or otherwise, the sensor plate 108 moves back up into the no load position shown in FIG. 2C as the upstream 113 and downstream 114 links are pivoted counterclockwise as shown by phantom arrow 123 in response to spring motors 119. The up position of the sensor plate 108, i.e., that position shown in FIG. 2C, when no load is present in the off load station S1 is established by abutment of lock nuts 124 of rod 120 with the pivot axle 121. Note the downstream sensor plate link 114 extends beyond its pivot connection 118 with the load support frame's side rail 14, 15 and is also pivotally connected to the station lock out system as described in detail below.

The accumulator conveyor station lock out system is illustrated in FIGS. 2A-2C, and 5-8. That portion of the station lock out system that is incorporated in each modular intermediate sections 38 of the shuttle frame 18 is identical from one modular intermediate section to another. However, that portion of the station lock out system connected with the upstream end section 36 of the shuttle frame 18, that portion of the station lock out system connected with the downstream end section 37 of the shuttle frame 18, and that portion of the station lock out system connected with the off load station S8 section of the load support frame 11, all differ one from the other, and from the portions of the station lock out system connected with each modular intermediate section 38.

As to each modular intermediate section 38 of the shuttle frame 18, the station lock out system, as illustrated in FIGS. 2A and 5-8, is partially connected to the pusher bar 22, and partially connected to the modular shuttle frame braces 41, 42. Each modular intermediate station 38, includes a station lock out device 23 that includes a spring 126 loaded latch dog 127 carried in bracket 128 fixed to the underside of face 98 of the pusher bar 22. The dog's bracket 128 includes flanges 129 bolted to the underside of the pusher bar, and the latch dog 127 is continuously biased in the machine direction MD by compression spring 126 interposed between the latch dog's rear face 130 and end wall 131 of the bracket. The latch dog 127 is held in assembly with the bracket 128 by stop pin 132 that extends through slot 133 in the bracket's bottom face 134, the latch dog's extended most position being established when that stop pin abuts downstream end 135 of that slot. The latch dog 127 (which, like the pusher bar 22, is located at the downstream end 48 of the module's frame 39-43) is adapted to cooperate with a ratchet 136 which is located at the upstream end 49 of an adjacent downstream module's frame. The ratchet 136, which is clearly shown in FIGS. 2A and 8, is connected at the upstream end 137 of a connector rod 138 that extends the length of the module's frame 39-43 as shown in FIG. 5, that connector rod being carried for sliding motion relative to the module's frame in connector rod brackets 139, 140 attached to upstream 41 and downstream 42 transverse cross braces of the module's frame. The downstream end 141 of the connector rod 138 is connected with a pivotable pusher bar 22 by means of a yoke 142 and bellcrank 143 structure, see FIGS. 6 and 8. The Y-shaped yoke 142 is pivotally connected as at 144 to the downstream end 141 of the connector rod 138, the outer arms 145 of the yoke being pivotally connected as at 146 to the bellcranks 143. Each bellcrank's shoulder 147 is fixed as by welding to the undersurface of face plate 98 of pusher 22 and is pivoted on the pusher bar's pivot pin 92. The bellcrank is held in lateral position on pivot pin 92 by centering sleeves 148, and two bellcranks plates 145 are fixed for pivot motion one with the other by virtue of being immobilely interconnected through spacer block 149. Accordingly, the pusher bar 22 is also pivotally connected with the station's connecting rod 138 by bellcranks 143 and Y-shaped yoke 142 so that when the pusher bar is moved toward the retracted position as shown in FIG. 8 the connecting rod 138 linearly moves in an upstream direction shown by phantom arrow 150, and when the pusher bar is moved toward its extended or pushing position shown in FIG. 2A the connecting rod linearly moves in a downstream direction shown by phantom arrow 151. And this, in turn, serves to move the latch ratchet 136 upstream into the latching position as shown in solid lines in FIG. 8 and downstream out of the latching position as shown in phantom lines in FIGS. 8 and 2A. This downstream latching movement is limited by a stop 125 which engages bracket 139.

The upstream position of the connecting rod 138 and, hence, of the latch ratchet 136, is the normal position of the connecting rod, and is established when the pusher bar's surface 98 abuts the under surface 99 of the pusher bar stop 100, i.e., when the pusher bar 22 is stopped in its pivot motion 95 against the pusher bar brace 100 as biased by pusher bar spring 97. So in the normal or unloaded and at rest position of the accumulator conveyor 10 as shown in FIG. 2A, the pusher bar 22 is extended above the support plane 17 as biased by pusher bar spring 97 so that the latch dog 127 of an upstream station is spaced above the adjacent latch ratchet 136 of a downstream station, and so that the upstream station's latch dog will not interengage or latch with the downstream station's latch ratchet even if the pusher bar of the upstream station is depressed or deflected into the FIG. 8 storage position, note particularly the swing arc 152 of the latch dog and the solid line position of the latch ratchet 136 as shown in FIG. 2A. However, and when the pusher bar 22 of the downstream station is deflected beneath the support plane 17 by virtue of a load L1-l8 passing thereon, that downward pivoting motion 96 moves the connecting rod 138 upstream to position the downstream station's latch ratchet 136 into a latch position (note phantom lines of FIG. 2A) where it can indeed interact with the upstream station's latch dog 127 when the upstream station's pusher bar is deflected or retracted into the solid line FIG. 8 position by virtue of a load passing thereover. And as shown in FIG. 8, with the downstream latch ratchet 136 so positioned indeed the upstream station's latch dog 127 does interengage with that latch ratchet to latch down or lock out the pusher bar 22 in the retracted FIG. 8 position.

Note particularly, as shown in FIG. 2A, that the connector rod 138 which interconnects a modular station's latch ratchet 136 with its pusher bar 22 is not of a rigid one piece structure, but instead is comprised of upstream rod 153 and downstream rod 154, the upstream rod being fixed to sleeve 155 by pins 156 that is telescoped over the downstream rod to establish a slideable relation between the downstream rod and the upstream rod. The downstream rod 154 carries pin 157 that slides in loss motion slot 158 in the sleeve 155, and a compression spring 159 is interposed between the end of the upstream rod's sleeve 153 and the washer 160 fixed to the downstream rod, thereby continuously spring biasing the upstream rod away from the downstream rod but permitting relative movement therebetween. Specifically, in this regard, and when the pusher bar 22 of FIG. 2A is deflected or retracted into the return stroke position shown in FIG. 8, the connector rod 138 is moved in the upstream direction until stop pin 125 on the upstream rod 155 section abuts stop bracket 139 fixed to a shuttle frame cross brace 41, thereby positively orienting the latch ratchet 136 in the desired latching position. But in the event the pusher bar 22 is depressed or retracted a substantial distance beneath support plane 17 (such as occurs in the event of a downwardly bulging defect 162 in the bottom surface 104 of the load that passes over the pusher bar as shown in FIG. 8), then the loss motion slot 158 permits the downstream rod 154 to move upstream relative to the upstream rod 153 without causing structural breakage of the stop pin 161 with the abutment bracket 139 that otherwise might occur.

That portion of the station lock out system connected with the upstream end section 36 of the modular frame 18 simply comprises a spring loaded latch dog 127 received in a bracket 128 fixed to the underside of the pusher bar 22. The upstream end section 36 of the shuttle frame 18 does not incorporate a connector rod 138 nor yoke 142 nor latch ratchet 136 nor bell-crank 143. That portion of the station lock out system interconnected with the downstream end station 37 of the shuttle frame 10 is particularly illustrated in FIG. 2B. As there shown, a connector rod 163 is slideably received in bearings 164, 165 attached by brackets 166, 167 to cross braces 168, 169 of that portion of the shuttle frame 18 defined by that downstream end section 37. The upstream end 170 of the connector rod 163 receives a latch ratchet 136 as before. A spring motor 171 interposed between the latch ratchet 136 and the bearing bracket 166 continuously spring loads that connector rod in the upstream direction as shown by phantom arrow 172. When there is nothing to interrupt that upstream motion, the latch ratchet 136 is biased in the upstream direction to a latch position shown in phantom lines in FIG. 2B as established by stop pin 173 on the connector rod 163 abuting against bearing bracket 167. This normal bias in the upstream direction 172 (as induced by spring motor 171) of latch ratchet 136 connected to the shuttle frame's downstream end section 37 is directly opposite to the normal bias in the downstream or machine direction MD (as induced by pusher bar return springs 97) of the latch ratchets 136 connected to the shuttle frame's intermediate sections 38. The downstream end 174 of the connector rod 163 in the shuttle frame's downstream end section 37 carries part of the conveyor's lock out actuator latch 24. The lock out actuator latch 24 includes a weighted latch finger 175 pivotally connected at 176 to the rod's downstream end 174. This weighted latch finger 175 has a channel shaped configuration so that when it is otherwise free to move as desired, end edge 177 abuts the connector rod 163 to locate the weighted latch finger in the latch position shown in FIG. 2B. When in the latch position, the latch finger 175 cooperates with that part of the lock out actuator latch 24 (to be described) fixed to the load support frame 11.

The lock out actuator latch 24 is interconnected with the sensor plate 108 mounted on the load support frame 11, and is activated/de-activated by the up/down motion of that sensor plate 108, all as illustrated in FIGS. 2B and 2C. The lock out actuator latch 24 also includes a lock out actuator rod 178 reciprocable in motion paths 150, 151, that lock out actuator rod being slideable in bearings 179, 180 carried by bearing brackets 181, 182 fixed to support frame 11. The downstream end 183 of the lock out actuator rod 178, as illustrated in FIG. 2C, is connected to the sensor plate's downstream end link 114 by connector link 184. Accordingly, when a load L1 is received on the sensor plate 108, thereby causing the sensor plate to deflect downwardly in the direction shown by phantom arrows 185 of FIG. 2C, the downstream end pivot links 114, 184 causes the lock out actuator rod 178 to move in the upstream direction shown by phantom arrow 150 because of the interconnection established by connector link 184. The upstream end 186 of the lock out actuator rod 178 is pivotally connected by connector link 187 with a bellcrank latch stop 188 itself pivotally connected as at 189 on a cross brace 35 of the load support frame 11. The bellcrank latch stop 188 is pivotally connected to the main support frame at shoulder 190, and is pivotally connected at hand 191 by connector link 187 with the actuator rod's upstream end. The forehead 192 of the bellcrank latch stop 188 carried by stationary load support frame 11 provides a stop surface 193 that cooperates with the weighted latch finger 175 carried by the shuttle frame 18. More specifically, and in response to upstream motion shown by phantom arrow 150 of the lock out actuator rod 178 in response to the sensor plate 108 being depressed as a load L1 is received thereon, the bellcrank latch stop 188 is pivoted in the direction shown by phantom arrow 194 to remove the forehead stop 193 area as an abutment for the shuttle frame's weighted latch finger 175. This, in turn, permits the shuttle frame's end section's connector rod 163, shown in FIG. 2B, to move in the upstream direction 172 as powered by spring motor 171 since the latch finger 175 simply passes over top surface 195 of the bellcrank latch stop 188 which has pivoted out of the way. And this action then positions latch ratchet 136 of the shuttle frame's downstream end section 37 in latch position relative to pusher bar 22 of the load station L2 carried by the shuttle frame 18. This, then, is the sequence that starts the lock out operation of the accumulating conveyor 10 as soon as, and when, a load L1 is received in the conveyor's off load station S1. When the load L1 is removed from the off load station S1, then spring motor 119 for the sensor plate 108 causes the sensor plate to pop back up into the inactive position shown in FIG. 2C which, in turn, causes the lock out actuator rod 178 to be drawn in the downstream direction shown by phantom arrow 151. This, in turn, causes the bellcrank latch stop 188 to be pivoted back up into the latch position shown in FIG. 2B. And when the shuttle frame 18 moves into the downstream position of its reciprocable cycle path, i.e., when the pivot 69 of the drive mechanism's crank 68 achieves position C in its cycle, then the latch finger 175 pivots up over the top surface 195 of the bellcrank latch stop 188 and falls down into the latch position shown in FIG. 2B, thereby withdrawing the latch ratchet 136 at the upstream end of the station S1 from potential latching relation with the latch dog 127 at the downstream end of the next adjacent upstream station S2.

In use of the accumulator conveyor of this invention, it will be understood, as shown in FIGS. 1B and 3, that the shuttle frame drive mechanism 19 can be continuously operated to continuously reciprocate the entire shuttle frame (and, therefor, all pusher bars P1-P7 together) in repeated stroke cycles, each cycle comprising an A to B return stroke segment, a B-C pusher stroke segment, and a C to A reset stroke segment with point A of the cycle being each pusher bar's rest position. However, the shuttle frame drive mechanism 19 also may by cycled, if desired, so there is a timed delay between successive strokes A to B, B to C and C to A of each drive cycle A to C. In other words, the A position of the drive mechanism 19 shown in FIG. 3 is the rest position A of the shuttle frame 18 (and, therefor, of all pusher bars P1-P7) as shown in FIG. 1B, the A-B stroke is the return stroke or ready stroke of the shuttle frame 18 (and, therefor, all pusher bars 22) and the drive mechanism 19, the B-C stroke is the pusher stroke of the shuttle frame 18/drive mechansim 19 cycle, and the C-A stroke is the reset stroke of that cycle. Of course, during continuous operation of the shuttle frame 18 and drive mechanism 19, all three strokes A-B, B-C, and C-A follow one right after the other continuously as the drive crank 68 continuously reciprocates the shuttle frame 18 in its back and forth reciprocable movement. So the pushers P1-P7 are parked in the A position as shown in FIG. 1B when the accumulator conveyor is not running.

Now it will be recalled all pushers P1-P7 are equally spaced one from the other to establish a series of successive load stations upstream of the off load station S1, which is at the downstream end of the conveyor 10, same including a queing station S2 just upstream of the off load station, a series of five intermediate stations S3-S7, and an on load station S8 at the upstream end of the conveyor. Each pusher P1-P7 is free to pivot or deflect downwardly beneath the bottom surface 104 of any load L1-L8 parked in its respective load station S2-S8 as shown in FIG. 8 as the shuttle frame 18 (and, therefor, the pushers 22) traverse return stroke A-B of the line cycle, each pusher being spring 97 loaded return to the up position shown in FIG. 2A when same reaches the B point of each stroke cycle. Since the length L' of each station S2-S8 is equal to the length of a load L''' plus a predetermined distance D, this predetermined distance creates a constant gap between loads L1-L8 of like size while they are parked or moving on the conveyor 10. And the predetermined distance or gap D also includes the short reset stroke length C-A (distance E) which allows for each pusher 22 to clear the bottom back edge 196 of each load L1-L8 so the pusher can pop or spring up to its pushing position, see FIG. 1B.

With regard to an accumulating step sequence as illustrated in FIG. 1B, sketch 1, load L1 is initially placed on the conveyor's main frame 11 at the in-load station S8, e.g., by forklift truck. With the shuttle frame 18 (and, hence, all pusher bars P1-P7) starting from the rest position A (shown in FIG. 1B sketch 1), the pusher bar P7 is deflected beneath the load bottom surface 104 in the return stroke A to B portion of that pusher's cycle (shown in FIG. 1B sketch 2 and 8) until that pusher P7 is positioned upstream of the rear face 197 of the load L1 where the pusher P7 will spring back up to the push position (shown in FIG. 1B sketch 3). In other words, after the pusher P7 has ducked under the load L1 at station S8, and when the drive crank 68 arrives at point B in its stroke cycle as shown in FIGS. 3 1B sketch 3 and, the pusher P7 will have cleared the bottom rear edge 196 of the load L1 so that it can pop back up into the pushing position. The shuttle frame 18 then reverses direction into the machine direction MD, i.e., into the B to C stroke of the drive cycle, to push the load L1 from load station S8 to load station S7 (shown in FIG. 1B sketch 4). And with the drive mechanism 19 running continuously or intermittently, this stroke action sequence will continue at each successive load station S8-S2 until load L1 is pushed into and arrives at the off load station S1 (shown in FIG. 1B sketch 5).

In the off load station S1, and as previously described, with the load L1 resting on top of sensor plate 108, that sensor plate is moved downwardly in the direction shown by phantom arrow 185 in FIG. 2C so as to move the lock out actuator rod 178 upstream in the direction shown by arrow 150 so as to unlatch the lock out actuator latch 24 from the latching position shown in solid lines in FIG. 2B to the unlatching position shown in phantom lines in FIG. 2B. This unlatching position of the lock out actuator latch 24 permits the spring motor 171 to move the ratchet latch control rod 163 and, hence, the latch ratchet 136 of queing station S2, from the inactive position shown in solid lines in FIG. 2B to the active position shown in phantom lines in FIG. 2B. Now if no other load L2-L8 has entered the conveyor 10 at the on load station S8, the shuttle frame 18 (and, hence, all pusher bars P1-P7) continues to cycle in its reciprocatory with all pusher bars 22 upraised or active as shown in FIG. 1B sketch 5. This situation remains unless and until load L1 is removed from the off load station S1.

When load L2 is placed in the on load station S8 (shown in FIG. 1B sketch 6), and as the shuttle frame 18 cycles on its return stroke A to B and its pushing stroke B to C, the pusher bar P7 in the on load station S8 moves the load L2 from the on load station to load station S7 as was the case with the load L1. And the load L2 is continuously moved along the conveyor in a downstream flow direction MD, with pushers 22 of successive load stations L8-L2 alternately ducking under the load L2 on the return stroke A to B and their pushing the load to the next adjacent downstream load station on the pushing stroke B to C, until the load L2 achieves the queing station S2 and is pushed into its final position shown in FIG. 1B sketch 7 by pusher bar P2. Pusher bar P1 ducks under the load L2 so parked on its first return stroke A to B. And when the pusher bar P1 ducks under the load L2 parked in station S2, that pusher bar's dog 127 interengages with the latch ratchet 136 previously set in the active position, shown in phantom lines in FIG. 2B, due to load L1 being parked in the off load station S1. In other words, pusher bar P1 will be locked out or deactivated in its deflected position in station S2 because with load L2 in a stationary position on load support frame 11 in that station, and as the pusher bar P1 moves in the retract stroke A to B where it is deflected under that load L2, the latch dog 127 of that pusher bar P1 engages the latch ratchet 136 as preset by spring motor 171 so as to lock out that pusher bar P1. This latch ratchet 136 for pusher bar P1 was reset, it will be recalled, when the first load L1 was received in the off load station S1 to depress the sensor plate 108. As a result, when the pusher bar P1 begins its forward or pushing stroke B-C with the load L2 in the queing station S2 (shown in FIG. 1B sketch 7), that pusher bar P1 will have been locked out by the stroke segment A-B and hence be in a FIG. 8 type position. And so with the pusher bar P1 locked down, the shuttle frame 18 can reciprocate back and forth, i.e., can continue to cycle, as often as necessary or desired without the pusher bar P1 pushing the load L2 in the queing station S2 into the load L1 parked in the off load station S1. A load station in station S2 also primes the lock out mechanisms 23 for pusher bar P2 so that the same condition (described above for station 1) will exist for station 2 and bar P2.

As was the case with load L2, successive loads L3-L7 can be cycled from the accumulator conveyor's in load station S8 into successive station accumulated relation. In connection with each successive load L3-L7, and after it is pushed into its respective load station S3 to station S7 by pusher bars P3-P7 respectively, as the respective pusher bar commences a new return stroke from A-B the pusher bar will be deflected or pivoted downwardly beneath the load's bottom surface 104. And since the connector rod 138 connected with the prior downstream pusher bar P2 et al has preset the adjacent upstream station's latch ratchet 136 as shown in FIG. 8, the immediately upstream station receiving a new load from pusher bar P3 et al will not have a pusher bar P3 et al to push the load L3 et al into the immediately downstream load because the pusher bar P3 et al will be held out of pushing relation by the station lock out system. FIG. 1A and FIG. 1B sketch 8 illustrate a fully loaded conveyor (S1 thru S7 and a load or inload station S8).

Now when the load L1 is removed from the off load station S1, this permits the sensor plate 108 to move back up into the sensing position (shown in FIG. 2C) which, in turn, permits the queing station latch ratchet 136 to be repositioned in active position shown in solid lines in FIG. 2B. And when the shuttle frame 18 is next at the downstream end C of a reciprocatory cycle, the weighted latch finger 177 engages the repositioned bellcrank latch stop 188 to hold the latch ratchet 136 of the queing station S2 out of a prospective latching position with the latch dog 127 on the pusher bar P1. This permits the spring loaded pusher bar P1 to pop back up into position when it reaches point B of a cycle which simultaneously retracts the latch ratchet 136 of adjacent upstream station S3 from latched relation with pusher bar P3 (because of the interconnection between pusher bar P2 and that latch ratchet 136). And the continued unlocking of previously locked down pusher bars P3-P7 then occurs in upstream succession in response to successive cycles A to B to C to A of the shuttle frame 18. With the pusher bar P1 unlatched, then pusher bar P1 pushes load L2 into the S1 position during the pushing stroke B-C of the cycle. And so all succeeding loads L3-L8 on the accumulating conveyor are moved up one position in sequence.

One of the principle features of this invention is the station lock out system which permits the pusher bars P1-P7 to compensate for irregularities on the bottom surface of a load or pallet when the pusher bar is locked down during the return stroke A to B of the drive cycle. A typical such irregularity is shown in FIG. 8. Note the latch ratchet 136 has a series of teeth 136a-136e any pair of which can interact with a latch dog 127 on the pusher bar 22. When the pusher bar's roller 101 simply rolls across a perfectly flat bottom surface of a load L1-L8 that is co-extensive with the conveyor's support plane 17, the pusher bar is simply deflected downwardly sufficient for latch dog to be latched out by the first pair of teeth 136a/b in the ratchet. If this was the only lock out position for the pusher bar 22, and if a successive load had a downwardly bulging irregularity 162 as shown in FIG. 8, then the pusher bar would rattle or become unlocked every time the shuttle frame 18 reciprocated the pusher bar 22 back and forth across that irregularity in the load's bottom surface 104. But with applicant's invention, and by providing three more pair 136b/c, 136c/d 136d/e of teeth, if an irregularity 162 occurs the pusher bar 22 is simply pivoted that much further in the direction shown by phantom arrow 96 so that latch dog 127 interengages, as shown in FIG. 8, the third tooth pair 136c/d of the latch ratchet. This means that as long as the load with an irregular bottom surface is retained within a particular station, and as long as the shuttle frame 18 reciprocates the locked out pusher bar 22 back and forth beneath the bottom surface 104 of that load, the pusher bar will not significantly bounce across that irregularity, and will remain in a locked out position that is significantly beneath the bottom surface of the load. This, in turn, eliminates a very noisy problem which might otherwise occur with that particular pusher bar on continuous reciprocation of the shuttle frame 18. So holding the pusher bar 22 in a position at a point just where the roller 101 only barely touches the planar bottom surface 104 of the load, or the lowest point 162 of an irregular bottom surface, allows the pusher bar 22 to skim along beneath the load on its return stroke instead of bouncing at the irregularity 162 which would cause excessive noise.

Having described in detail the preferred embodiment of my invention, what I desire to claim and protect by Letters Patent is:

1. An accumulator conveyor comprising
    a load support surface, said support surface defining a load support plane on which one or more loads are supported as these loads are conveyed along the length of said conveyor, and said support frame having a series of load stations along the length of said conveyor,
    a shuttle frame operably connected with said load support surface, said shuttle frame being adapted to reciprocate in a direction co-extensive with the machine direction of said conveyor,
    a series of deflectable pusher bars connected with said shuttle frame, the distance between two adjacent pusher bars defining the length of a load station, each of said pusher bars being movable between an extended position above said load support plane to push a load from an upstream station to an immediately adjacent downstream station, and a retracted position not above said support plane so as to pass beneath a load parked in that upstream station, all of said pusher bars being simultaneously moved in a machine direction push stroke, and then simultaneously moved in a reverse direction return stroke, as said shuttle frame reciprocates relative to said load support surface, and each of said pusher bars functioning to sense the presence or absence of a load in that load station served by said pusher bar on each return stroke of said pusher bar, and a station lock out system connected with said pusher bars for latching said pusher bars down in said retracted position, an upstream station's pusher bar being latched down in said retracted position only if an immediately downstream station's pusher bar has been previously latched down, an upstream station's pusher bar being latched down in response to a load sensed in an immediately downstream station by that downstream station's pusher bar, said station lock out system thereby preventing potentially damaging contact of a pusher bar with a load parked in a load station upon continued reciprocation of said shuttle frame while permitting successive loads to be accumulated in and removed from successive load stations.

2. An accumulator conveyor as set forth in claim 1, said load support surface comprising opposed side rails that define a load support frame, and a series of idler wheels mounted on each of said side rails, said idler wheels serving to support the loads that move along said conveyor, and said idler wheels defining said load support plane.

3. An accumulator conveyor as set forth in claim 1, said conveyor comprising shuttle frame support structure partially carried by structure fixed to said load support surface and partially carried by said shuttle frame to support said shuttle frame in its reciprocatory motion.

4. An accumulator conveyor as set forth in claim 3, said shuttle frame support structure comprising a series of idler wheels mounted on one of said shuttle frame and said load support surface structure, and tracks on the other of said shuttle frame and said load support surface structure, said tracks cooperating with said shuttle frame support wheels.

5. An accumulator conveyor as set forth in claim 4, said shuttle frame support structure comprising a series of centering wheels mounted on one of said shuttle frame and said load support surface structure, said centering wheels cooperating with the other of said shuttle frame and said load support surface structure to maintain alignment between said shuttle frame and said load support surface.

6. An accumulator conveyor as set forth in claim 1 comprising a drive mechanism connected with said shuttle frame to reciprocate said shuttle frame relative to said main support surface, said drive mechanism comprising a drive sprocket and an idler sprocket, said sprockets being connected by a drive chain, and a crank connected at one end to said drive chain and at the other end to said shuttle frame, rotation of said drive sprocket causing said crank to move with said drive chain around said drive and idler sprockets, thereby reciprocating said shuttle frame.

7. An accumulator conveyor as set forth in claim 6, said sprockets being oriented generally parallel to ground, and being positioned beneath said shuttle frame, and said drive mechanism comprising an adjustment assembly connected with said drive mechanism to permit adjustment of said crank's throw length.

8. An accumulator conveyor as set forth in claim 1, said shuttle frame comprising a series of modular load station sections, each of said sections being of a length approximately equal to the length of a load station, each of those sections having its own modular frame, and each of those sections having a deflectable pusher bar mounted on its modular frame, and connector means associated with each of said load station sections, said connector means connecting that series of modular load station sections into a single unitary shuttle frame.

9. A shuttle conveyor as set forth in claim 8, said shuttle frame comprising an upstream end section having a frame of a length sufficient only to mount a deflectable pusher bar.

10. A shuttle conveyor as set forth in claim 9, said shuttle frame comprising a downstream end section having no deflectable pusher bar, and a latch system component that cooperates to lock out with that pusher bar in the modular section immediately upstream therefrom to latch down that pusher bar when said latch system component is activated.

11. An accumulator conveyor as set forth in claim 1, said station lock out system comprising a station lock out latch partially connected to a pusher bar of an upstream station and partially connected to a pusher bar in an adjacent downstream station, that station lock out latch being adapted to latch down the pusher bar in the upstream station.

12. An accumulator conveyor as set forth in claim 11, the downstream station latch component being held in latching position for the upstream station latch component only if the downstream station pusher bar has been previously latched down.

13. An accumulator conveyor as set forth in claim 11, the downstream station latch component being cycled between latch and unlatch positions as the downstream station's pusher bar is deflected down and popped up, respectively, relative to said main support plane.

14. An accumulator conveyor as set forth in claim 11, the upstream station latch component being cycled between latch and unlatch positions as the upstream station's pusher bar is deflected down and popped up, respectively, relative to said main support plane.

15. An accumulator conveyor as set forth in claim 11, said downstream station's latch component being one of a dog and ratchet, and said upstream station's latch component being the other of a dog and ratchet.

16. An accumulator conveyor as set forth in claim 11, said station lock out latch comprising a connector rod connected between said downstream station's pusher bar and said downstream station's latch component, said connector rod having a lost motion slot therein, and a stop adapted to locate said downstream station's latch component in latching position relative to said upstream station's pusher bar, said lost motion slot accommodating any excess motion in said connector rod created by movement of the downstream station's pusher bar.

17. An accumulator conveyor as set forth in claim 1, said station lock out system comprising plural lock out position structure for latching down a pusher bar at any one of plural positions beneath the main support plane, the latched out position of that pusher bar being dependent on the presence or absence of the deformity in any load parked in the load station where that deformity extends beneath the main support plane.

18. An accumulator conveyor as set forth in claim 1, said conveyor comprising
a lock out actuator latch mounted at the off load station, said latch being adapted to activate said station lock out system when a load is parked in said off load station.

19. An accumulator conveyor as set forth in claim 18, said lock out actuator latch comprising
a sensor plate adapted to be moved from a rest position to a sensing position in response to presence of a load in said off load station.

20. An accumulator conveyor as set forth in claim 19, said lock out actuator latch comprising
a downstream latch component fixed to said support load surface, and
an upstream latch component connected to the downstream end of said shuttle frame.

21. An accumulator conveyor as set forth in claim 20, said lock out actuator latch comprising
a spring motor connected with said shuttle frame's upstream latch component, said spring motor being adapted to move said upstream latch component to latch position for that load station adjacent to, and upstream of, said off load station.

22. An accumulator conveyor as set forth in claim 21, said lock out actuator latch comprising
a gravity type latch adapted to automatically re-latch upon reciprocation of said shuttle frame after a load in said off load station has been removed therefrom.

23. An accumulator conveyor comprising
a load support surface, said support surface defining a load support plane on which one or more loads are supported as those loads are conveyed along the length of said conveyor, and said support surface having a series of load stations along the length of said conveyor,
a series of deflectable pusher bars associated with said load support surface, the distance between two adjacent pusher bars defining the length of a load station, each of said pusher bars being movable between an extended position above said load support plane to push a load from an upstream station to an immediately adjacent downstream station, and a retracted position not above said support plane so as to pass beneath a load parked in that upstream station, each of said pusher bars each being movable in a machine direction push stroke, and each being movable in a reverse direction return stroke, to move one or more loads from one load station to another along the length of said conveyor, and
a station lock out device cooperable with each pusher bar to latch down that pusher bar at said retracted position, said station lock out device having a series of lock out positions so each pusher bar can be latched down at any one of plural positions beneath said load support plane, that lock out position selected being dependent on whether any portion of the bottom surface of a load parked in the load station served by that pusher bar extends beneath that load support plane, the lock out position used being such that said pusher bar can reciprocate beneath the load parked in that load station without substantial downward movement of said pusher bar whether that load has a planar bottom surface coextensive with said load support plane or a bottom surface with a portion that extends beneath said load support plane.

24. An accumulator conveyor as set forth in claim 23, said station lock out device being activated in response to reciprocation of said pusher bar, an upstream station's pusher bar being latched down in said retracted position only if an immediately downstream station's pusher bar has been previously latched down.

25. An accumulator conveyor as set forth in claim 23, said station lock out device comprising
a station lock out latch partially connected to a pusher bar of an upstream station and partially connected to a pusher bar in an adjacent downstream station, that station lock out latch being adapted to latch down the pusher bar in the upstream station.

26. An accumulator conveyor as set forth in claim 25, the downstream station latch component being held in latching position for the upstream station latch component only if the downstream station pusher bar has been previously latched down.

27. An accumulator conveyor as set forth in claim 26, the downstream station latch component being cycled between latch and unlatch positions as the downstream station's pusher bar is deflected down and popped up, respectively, relative to said main support plane.

28. An accumulator conveyor as set forth in claim 27, the upstream station latch component being cycled between latch and unlatch positions as the upstream station's pusher bar is deflected down and popped up, respectively, relative to said main support plane.

29. An accumulator conveyor as set forth in claim 28, said downstream station's latch component being one of a dog and ratchet, and said upstream station's latch component being the other of a dog and ratchet.

30. An accumulator conveyor as set forth in claim 29, said station lock out latch comprising
a connector rod connected between said downstream station's pusher bar and said downstream station's latch component, said connector rod having a lost motion slot therein, and
a stop adapted to locate said downstream station's latch component in latching position relative to said upstream station's pusher bar, said lost motion slot accommodating any excess motion in said connector rod created by movement of the downstream station's pusher bar.

31. An accumulator conveyor as set forth in claim 23, said conveyor comprising
a lock out actuator latch mounted at an off load station, said latch being adapted to activate said station lock out system when a load is parked in said off load station.

32. An accumulator conveyor as set forth in claim 31, said lock out actuator latch comprising
a sensor plate adapted to be moved from a rest position to a sensing position in response to presence of a load in said off load station.

33. An accumulator conveyor as set forth in claim 32, said lock out actuator latch comprising
a downstream latch component connected to said main support latch surface, and
an upstream latch component connected to a pusher bar.

34. An accumulator conveyor as set forth in claim 33, said lock out actuator latch comprising a spring motor connected with said upstream latch component, said spring motor being adapted to move said upstream latch component to latch position for that load station adjacent to, and upstream of, said off load station.

35. An accumulator conveyor as set forth in claim 34, said lock out actuator latch comprising a gravity type latch adapted to automatically relatch upon reciprocation of said pusher bar after a load in said off load station has been removed therefrom.

36. An accumulator conveyor comprising a load support surface, said load support surface defining a load support plane on which one or more loads are supported as those loads are conveyed along the length of said conveyor, and said support surface having a series of in-line load stations along the length of said conveyor, and having an off load station at the downstream end of said in-line load stations, a series of deflectable pusher bars located along the length of said main support surface, the distance between two adjacent pusher bars defining the length of an in-line load station, said pusher bars each being adapted to push a load from an upstream in-line load station to an adjacent downstream in-line load station one load at a time as successive loads are presented to that upstream station and removed from that downstream station, and adapted to push a load into said off load station after that load has been pushed to the downstream end of said in-line load stations, and each of said pusher bars functioning to sense the presence or absence of a load in that load station served by said pusher bar, a series of in-line load station lock out devices, each of said in-line devices being adapted to latch down a pusher bar of an upstream station when a load is parked in an adjacent downstream station, said latch down position being not above said load support plane so that said pusher bar can pass beneath a load parked in said upstream station, and an off load station latch device connected to an in-line station lock out device at the adjacent in-line load station, said off load device being operable to activate the adjacent in-line load station lock out device when a load is parked in said off load station for latching down that pusher bar in the adjacent in-line load station in a retracted position but to deactivate said adjacent in-line load station lock out device when no load is parked in said off load station for releasing that pusher bar in the adjacent in-line load station so it can return to a push position, said off load station latch device being operable solely in response to the presence or not of a load in said off load station.

37. An accumulator conveyor as set forth in claim 36, said station lock out device being activated in response to reciprocation of said pusher bar, an upstream station's pusher bar being latched down in said retracted position only if an immediately downstream station's pusher bar has been previously latched down.

38. An accumulator conveyor as set forth in claim 37, said station lock out device comprising a station lock out latch partially connected to a pusher bar of an upstream station and partially connected to a pusher bar in an adjacent downstream station, that station lock out latch being adapted to latch down the pusher bar in the upstream station, the downstream station latch component being held in latching position for the upstream station latch component only if the downstream station pusher bar has been previously latched down, the downstream station latch component being cycled between latch and unlatch positions as the downstream station's pusher bar is deflected down and popped up, respectively, relative to said main support plane, and the upstream station latch component being cycled between latch and unlatch positions as the upstream station's pusher bar is deflected down and popped up, respectively, relative to said main support plane.

39. An accumulator conveyor as set forth in claim 38, said downstream station's latch component being of a dog and ratchet, and said upstream station's latch component being the other of a dog and ratchet.

40. An accumulator conveyor as set forth in claim 39, said station lock out latch comprising a connector rod connected between said downstream station's pusher bar and said downstream station's latch component, said connector rod having a lost motion slot therein, and a stop adapted to locate said downstream station's latch component in latching position relative to said upstream station's pusher bar, said lost motion slot accommodating any excess motion in said connector rod created by movement of the downstream station's pusher bar.

41. An accumulator conveyor as set forth in claim 40, said station lock out system comprising plural lock out position structure for latching down a pusher bar at any one of plural positions beneath the main support plane, the latched out position of that pusher bar being dependent on the presence or absence of the deformity in any load parked in the load station where that deformity extends beneath the main support plane.

42. An accumulator conveyor as set forth in claim 36, said off load station latch device comprising a sensor plate adapted to be moved from a rest position to a sensing position in response to presence of a load in said off load station, a downstream latch component connected to said sensor plate, and an upstream latch component connected to the downstream one of said pusher bars.

43. An accumulator conveyor as set forth in claim 36, said lock out actuator comprising a spring motor connected with said upstream latch component, said spring motor being adapted to move said upstream latch component to latch position for that load station adjacent to, and upstream of, said off load station.

44. An accumulator conveyor as set forth in claim 36, said conveyor comprising a shuttle frame operably connected with said load support frame, said shuttle frame being adapted to reciprocate in a direction co-extensive with the machine direction of said conveyor.

45. An accumulator conveyor as set forth in claim 44, said load support surface comprising opposed side rails that define said a load support frame, and a series of idler wheels mounted on each of said side rails, said idler wheels serving to support the loads that move along said conveyor, and said idler wheels defining said load support plane.

46. An accumulator conveyor as set forth in claim 45, said conveyor comprising shuttle frame support structure partially carried by said load support frame and partially carried by said shuttle frame to support said shuttle frame in its reciprocatory motion.

47. An accumulator conveyor as set forth in claim 46, said shuttle frame support structure comprising a series of idler wheels mounted on one of said shuttle frame and said load support frame, tracks on the other of said shuttle frame and said load support frame, said tracks cooperating with said shuttle frame support wheels, and a series of centering wheels mounted on one of said shuttle frame and said load support frame, said centering wheels cooperating with the other of said shuttle frame and said load support frame to maintain alignment between said shuttle frame and said load support frame.

48. An accumulator conveyor as set forth in claim 44, comprising a drive mechanism connected with said shuttle frame to reciprocate said shuttle frame relative to said main support surface, said drive mechanism comprising a drive sprocket and an idler sprocket, said sprockets being connected by a drive chain, and a crank connected at one end to said drive chain and at the other end to said shuttle frame, rotation of said drive sprocket causing said crank to move with said drive chain around said drive and idler sprockets, thereby reciprocating said shuttle frame.

49. An accumulator conveyor as set forth in claim 44, said shuttle frame comprising a series of modular load station sections, each of said sections being of a length approximately equal to the length of a load station, each of those sections having its own modular frame, and each of those sections having a deflectable pusher bar mounted on its modular frame, and connector means associated with each of said load station sections, said connector means connecting that series of modular load station sections into a single unitary shuttle frame.

50. A shuttle conveyor as set forth in claim 49, said shuttle frame comprising an upstream end section having a frame of a length sufficient only to mount a deflectable pusher bar, and a downstream end section having no deflectable pusher bar.

* * * * *

UNITED STATES PATENT AND TRADEMARK OFFICE
CERTIFICATE OF CORRECTION

PATENT NO. : 4,768,646

DATED : September 6, 1988

INVENTOR(S) : Theodore R. Devins

It is certified that error appears in the above-identified patent and that said Letters Patent is hereby corrected as shown below:

Column 7, line 9 delete "no-lead" and insert -- no-load --.

Column 8, line 35 delete "upstream" and insert -- downstream --

Column 9 line 20 delete "pin 125" and insert -- pin 161 --.

Column 14 line 46 delete "these" and insert -- those --.

Column 18 line 66 delete "latch" and insert -- load --.

Column 9, line 31, delete "161" and insert --125--.

Signed and Sealed this

Twenty-ninth Day of May, 1990

Attest:

HARRY F. MANBECK, JR.

Attesting Officer

Commissioner of Patents and Trademarks